United States Patent
Park et al.

(10) Patent No.: US 9,411,491 B2
(45) Date of Patent: Aug. 9, 2016

(54) METHOD FOR PROVIDING GRAPHICAL USER INTERFACE (GUI), AND MULTIMEDIA APPARATUS APPLYING THE SAME

(75) Inventors: Chan-ho Park, Seoul (KR); Kyoung-nyo Hwangbo, Suwon-si (KR); Mi-kyoung Kim, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 1261 days.

(21) Appl. No.: 12/173,981

(22) Filed: Jul. 16, 2008

(65) Prior Publication Data

US 2009/0199119 A1  Aug. 6, 2009

(30) Foreign Application Priority Data

Feb. 5, 2008  (KR) .................. 10-2008-0011594

(51) Int. Cl.
| | | |
|---|---|---|
| G06F 3/048 | (2013.01) | |
| G06F 3/0481 | (2013.01) | |
| G06F 3/0484 | (2013.01) | |
| G06F 3/0482 | (2013.01) | |
| G06F 3/0485 | (2013.01) | |
| G11B 27/10 | (2006.01) | |
| G11B 27/34 | (2006.01) | |
| G06F 3/0486 | (2013.01) | |
| G06F 3/0488 | (2013.01) | |

(52) U.S. Cl.
CPC .......... *G06F 3/04817* (2013.01); *G06F 3/0482* (2013.01); *G06F 3/0484* (2013.01); *G06F 3/0486* (2013.01); *G06F 3/0488* (2013.01); *G06F 3/04842* (2013.01); *G06F 3/04847* (2013.01); *G06F 3/04855* (2013.01); *G11B 27/105* (2013.01); *G11B 27/34* (2013.01)

(58) Field of Classification Search
CPC  G06F 3/0484; G06F 3/04847; G06F 3/04855
USPC .................................. 715/720, 772, 786, 800
See application file for complete search history.

(56) References Cited

U.S. PATENT DOCUMENTS

| | | | |
|---|---|---|---|
| 5,553,225 A | 9/1996 | Perry | |
| 5,874,961 A | 2/1999 | Bates et al. | |
| 6,061,062 A * | 5/2000 | Venolia | 715/856 |
| 6,486,896 B1 * | 11/2002 | Ubillos | 715/784 |

(Continued)

FOREIGN PATENT DOCUMENTS

| | | |
|---|---|---|
| AU | 2007100826 | 9/2007 |
| JP | 11-345056 | * 12/1999 |

(Continued)

OTHER PUBLICATIONS

Sprint Touch by HTC 2007 184 pages.*

(Continued)

*Primary Examiner* — Andrea Long
(74) *Attorney, Agent, or Firm* — Sughrue Mion, PLLC

(57) ABSTRACT

A method for providing a graphical user interface (GUI) to receive a user command on a touch screen, and a multimedia apparatus using the same. The method for providing a GUI includes determining whether an enlargement command for a GUI item is received, and enlarging the GUI item. Therefore, it is possible to enable a user to operate the GUI item more correctly, and to provide the superior visual effect when the GUI item is operated.

33 Claims, 8 Drawing Sheets

(56) References Cited

U.S. PATENT DOCUMENTS

| | | |
|---|---|---|
| 6,922,816 B1 | 7/2005 | Amin et al. |
| 6,931,594 B1 | 8/2005 | Jun |
| 7,380,216 B2 * | 5/2008 | Feig et al. .................... 715/786 |
| 7,765,491 B1 * | 7/2010 | Cotterill ....................... 715/833 |
| 7,956,847 B2 * | 6/2011 | Christie ........................ 345/173 |
| 2002/0063737 A1 * | 5/2002 | Feig et al. .................... 345/786 |
| 2004/0233222 A1 * | 11/2004 | Lee et al. ...................... 345/621 |
| 2005/0086703 A1 * | 4/2005 | Gupta et al. .................. 725/135 |
| 2006/0022955 A1 * | 2/2006 | Kennedy ....................... 345/173 |
| 2006/0053387 A1 * | 3/2006 | Ording .......................... 715/773 |
| 2007/0047917 A1 * | 3/2007 | Sasaki et al. ................... 386/96 |
| 2007/0168413 A1 * | 7/2007 | Barletta et al. ................ 709/203 |
| 2007/0198111 A1 * | 8/2007 | Oetzel et al. ................... 700/94 |
| 2008/0165141 A1 * | 7/2008 | Christie ........................ 345/173 |
| 2008/0276272 A1 * | 11/2008 | Rajaraman et al. ............ 725/37 |
| 2009/0177998 A1 * | 7/2009 | Barrios et al. ................. 715/799 |
| 2009/0282362 A1 * | 11/2009 | Matsumoto ................... 715/787 |

FOREIGN PATENT DOCUMENTS

| | | |
|---|---|---|
| JP | 2002-109863 | 4/2002 |
| JP | 2004-280745 | 10/2004 |
| JP | 2006-164033 A | 6/2006 |
| KR | 1998-79502 | 11/1998 |
| KR | 10-2005-0105104 A | 11/2005 |

OTHER PUBLICATIONS

Peter B.L. Meijer Visual sounds from "The vOICe": Seeing with your Ears! Feb. 3, 2005 7 pages.*

GTK v1.2 Tutorial: Adjustments Jul. 23, 2002 3 pages.*

Extended European Search Report dated Dec. 19, 2012 issued in EP Application No. 08169341.8.

Communication dated Jul. 17, 2014 issued by the Korean Intellectual Property Office in counterpart Korean Patent Application No. 10-2014-0034306.

Communication dated Jul. 21, 2014 issued by the Korean Intellectual Property Office in counterpart Korean Patent Application No. 10-2008-0011594.

Communication issued on Feb. 12, 2015 by the European Patent Office in related Application No. 08169341.8.

Communication issued Dec. 8, 2015, issued by the European Patent Office in counterpart European Patent Application No. 15182607.0.

* cited by examiner

METHOD FOR PROVIDING GRAPHICAL USER INTERFACE (GUI), AND MULTIMEDIA APPARATUS APPLYING THE SAME

CROSS-REFERENCE TO RELATED APPLICATION

This application claims the benefit of Korean Application No. 2008-11594, filed Feb. 5, 2008 in the Korean Intellectual Property Office, the disclosure of which is incorporated herein by reference.

BACKGROUND OF THE INVENTION

1. Field of the Invention

Aspects of the present invention relate to a method for providing a graphical user interface (GUI) and a multimedia apparatus using the same, and more particularly, to a method for providing a GUI to receive a user command on a touch screen, and a multimedia apparatus using the same.

2. Description of the Related Art

A wide variety of multimedia apparatuses has been developed with the rapid advance of digital technology. As a result, the range of functions provided by multimedia apparatuses has increased exponentially.

Recently, the multimedia apparatuses have come to provide users with functions using menu items on a screen, taking the appearance of the multimedia apparatus and the convenience of accessing the multimedia apparatus into consideration. However, the screen is limited in size due to the need to consider the portability of the multiple devices. It is difficult for a user to operate various functions provided by the portable multiple device precisely using only the items provided on a small screen. Therefore, there is a need for a method for providing a GUI to provide a user with the ability to manipulate items on the screen more precisely, and to have enhanced visual effects.

SUMMARY OF THE INVENTION

Aspects of the present invention relate to a method for providing a graphical user interface (GUI) which provides a user with the ability to manipulate items on a touch screen more precisely, and which has superb visual effects.

According to an exemplary embodiment of the present invention, there is provided a method for providing a graphical user interface (GUI), the method including determining whether an enlargement command for a GUI item is received through a touch screen; and enlarging and displaying the GUI item, if it is determined that the enlargement command is received, wherein the GUI item enables a selection of one position from among a plurality of successive positions.

According to an aspect of the present invention, the GUI item may include at least one of a progress bar, a scroll bar and a status control bar.

According to an aspect of the present invention, the determining operation may include, if one of the positions on the GUI item is touched for a predetermined period of time or more, determining that the enlargement command is received; and the displaying operation may include enlarging a portion of the GUI item corresponding to a predetermined interval range the center of which is the touched position, and displaying the enlarged GUI item.

According to an aspect of the present invention, the determining operation may include, if one of the positions on the GUI item is touched more than once, determining that the enlargement command is received; and the displaying operation may include enlarging a portion of the GUI item corresponding to a predetermined interval range the center of which is the touched position, and displaying the enlarged GUI item.

According to an aspect of the present invention, the determining operation may include, if a first position on the GUI item is touched and the touched first position is dragged to a second position on the GUI item, determining that the enlargement command is received; and the displaying operation may include enlarging a portion of the GUI item between the first position and the second position, and displaying the enlarged GUI item.

According to an aspect of the present invention, the determining operation may include, if a first position and a second position on the GUI item are touched simultaneously or are touched separately within a predetermined period of time, determining that the enlargement command is received; and the displaying operation may include enlarging a portion of the GUI item between the first position and the second position, and displaying the enlarged GUI item.

According to an aspect of the present invention, the determining operation may include, if the GUI item is touched with a circular motion so that a circle is drawn passing through a first position and a second position on the GUI item, determining that the enlargement command is received; and the displaying operation may include enlarging a portion of the GUI item between the first position and the second position, and displaying the enlarged GUI item.

According to an aspect of the present invention, the displaying operation may include, if it is determined that the enlargement command is received, highlighting a position on the GUI item to which the enlargement command is to be applied, enlarging the GUI item and displaying the enlarged GUI item.

According to an aspect of the present invention, the displaying operation may include, if it is determined that the enlargement command is received, outputting audio information or video information to notify that the enlargement command has been received, enlarging the GUI item and displaying the enlarged GUI item.

According to an aspect of the present invention, the method for providing a GUI may further include determining whether a reduction command for the enlarged GUI item is received through the touch screen; and reducing the enlarged GUI item and displaying the reduced GUI item, if it is determined that the reduction command is received.

According to an aspect of the present invention, the displaying operation may include displaying the enlarged GUI item together with content that has been displayed prior to reception of the enlargement command.

According to another exemplary embodiment of the present invention, there is provided a multimedia apparatus including a touch screen to receive an enlargement command for a graphical user interface (GUI) provided enabling a selection of one position from among a plurality of successive positions; and a control unit to control the GUI item to be enlarged and displayed, if it is determined that the enlargement command is received.

According to an aspect of the present invention, the GUI item may include at least one of a progress bar, a scroll bar and a status control bar.

According to an aspect of the present invention, if one of a plurality of positions on the GUI item is touched for a predetermined period of time or more, the control unit may determine that the enlargement command is received, and may control a portion of the GUI item to be enlarged corresponding to a predetermined interval range the center of which is the touched position so that the enlarged GUI item may be displayed.

According to an aspect of the present invention, if one of the positions on the GUI item is touched more than once, the control unit may determine that the enlargement command is received, and may control a portion of the GUI item to be enlarged corresponding to a predetermined interval range the center of which is the touched position so that the enlarged GUI item may be displayed.

According to an aspect of the present invention, if a first position on the GUI item is touched and the touched first position is dragged to a second position on the GUI item, the control unit may determine that the enlargement command is received, and may control a portion of the GUI item to be enlarged between the first position and the second position so that the enlarged GUI item may be displayed.

According to an aspect of the present invention, if a first position and a second position on the GUI item are touched simultaneously or are touched separately within a predetermined period of time, the control unit may determine that the enlargement command is received, and may control a portion of the GUI item to be enlarged between the first position and the second position so that the enlarged GUI item may be displayed.

According to an aspect of the present invention, if the GUI item is touched with a circular motion so that a circle is drawn passing through a first position and a second position on the GUI item, the control unit may determine that the enlargement command is received, and may control a portion of the GUI item to be enlarged between the first position and the second position so that the enlarged GUI item may be displayed.

According to an aspect of the present invention, if it is determined that the enlargement command is received, the control unit may highlight a position on the GUI item to which the enlargement command is to be applied, and may control the GUI item to be enlarged and displayed.

According to an aspect of the present invention, if it is determined that the enlargement command is received, the control unit may output audio information or video information to notify that the enlargement command has been received, and may control the GUI item to be enlarged and displayed.

According to an aspect of the present invention, the control unit may determine whether a reduction command for the enlarged GUI item is received through the touch screen, and may control the enlarged GUI item to be reduced so that the reduced GUI item is displayed, if it is determined that the reduction command is received.

According to an aspect of the present invention, the control unit may control the enlarged GUI item to be displayed together with content that has been displayed prior to reception of the enlargement command.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
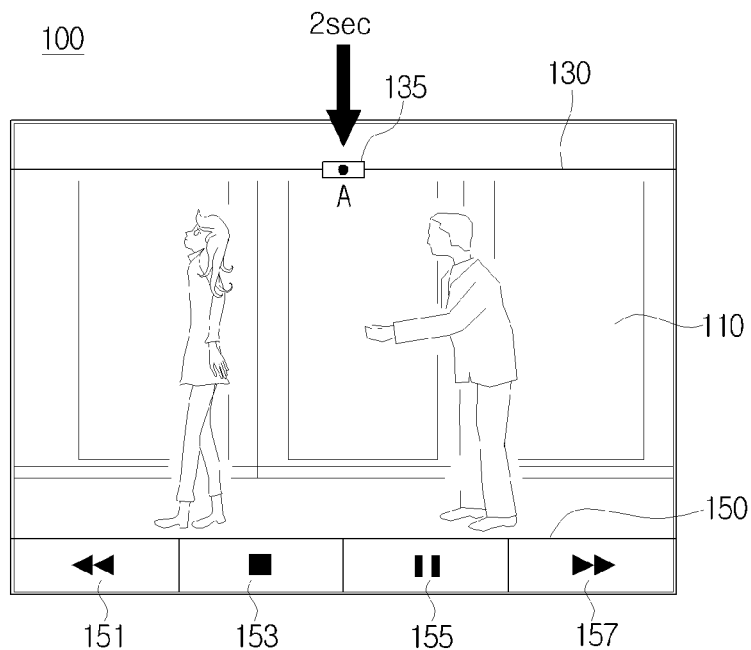
FIGS. 1A to 1G are views illustrating a method for enlarging a progress bar.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIGS. 1A to 1G are views illustrating a method for enlarging a progress bar 130 on a touch screen 100. FIG. 1A illustrates the touch screen 100 displaying graphical items. The touch screen 100 includes a screen 110 to display video content being currently played back, the progress bar 130 to load the current video content, and a set of items 150 to input commands for playing back and stopping the content, and skipping forward and back through the content.

The video content is played back on the screen 110. According to the exemplary embodiment of the present invention, the content may include video content such as movies or dramas, music content, and content combining music and video. The exemplary embodiment of the present invention adapts video content or music content incorporating video content to be displayed on the touch screen 100. However, the present invention may also be applied to music content without accompanying video. In this situation, video content may not be displayed on the screen 110, or images can be displayed, such as album covers or pictures chosen by the user. Moreover, aspects can be utilized during recording or editing of the contents in addition to or instead of reproducing the contents.

The set of items 150 includes a skip back item 151, a stop item 153, a play back or pause item 155, and a skip forward item 157. If a user touches one of the graphical items on the touch screen 100, the command corresponding to the touched element is input. For example, if the user selects the skip back item 151 while position 'A' of a video file is displayed, video ten minutes prior to position 'A' is displayed on the screen 110.

If the user selects the skip forward item 157, the multimedia apparatus adopts the same operational manner as the skip back item 151, so video ten minutes after position 'A' is displayed on the screen 110. The user may set a skipping time other than ten minutes using operational settings (not illustrated).

The set of items 150 may be semitransparent, and overlap with the video content. The set of items 150 may appear only when the user inputs a command to display the set of items 150, in order to minimize disturbance while viewing the video content. Further, it is understood that the set of items, 150 could include additional items in addition to or instead of the shown items. Examples of such other items include volume control, display contrast controls, system settings, file choosing commands, etc.

The progress bar 130 conveys the progress of content currently being played back. Specifically, the progress bar 130 provides a user with position information of the portion of content which is currently being played back from among the entire content to be played back. The position of the current portion of the content within the progress bar 130 is displayed distinctly from the progress bar 130, and may be represented using an icon or shape. However, it is understood that the current position can also be indicated using colors, with all prior content being one color and content yet to be played being another color.

In this exemplary embodiment of the present invention as shown in FIG. 1A, the progress bar 130 is indicated in a single line to approximately represent the entire video content, and a position indicator 135, which has a box shape containing a point, represents the position information of position 'A' which is currently being played back. Accordingly, position 'A', which is currently being played back is distinguished from the progress bar 130.

If the user changes the part of the content which is currently being played back using the set of items 150, the position indicator 135 moves to the location corresponding to the new part being played back. Alternatively, the user may change the part of the content currently being played back by moving the position indicator 135 along the progress bar 130, and thus the content is played back from a part corresponding to the new position of the position indicator 135, as the position indicator 135 is capable of being moved along the touch screen 100 by the operation of the user.

The user may move the position indicator 135 along the progress bar 130 by touching a location at which the user desires to position the position indicator 135. The placement of the position indicator 135 corresponds to the part of the content to be played back.

Hereinbelow, a method for enlarging the progress bar 130 in order to select more exactly a desired part on the progress bar 130 and for displaying the enlarged progress bar 130 will be explained in detail with reference FIGS. 1A to 1G, and 2A to 2D.

Figure 1B:
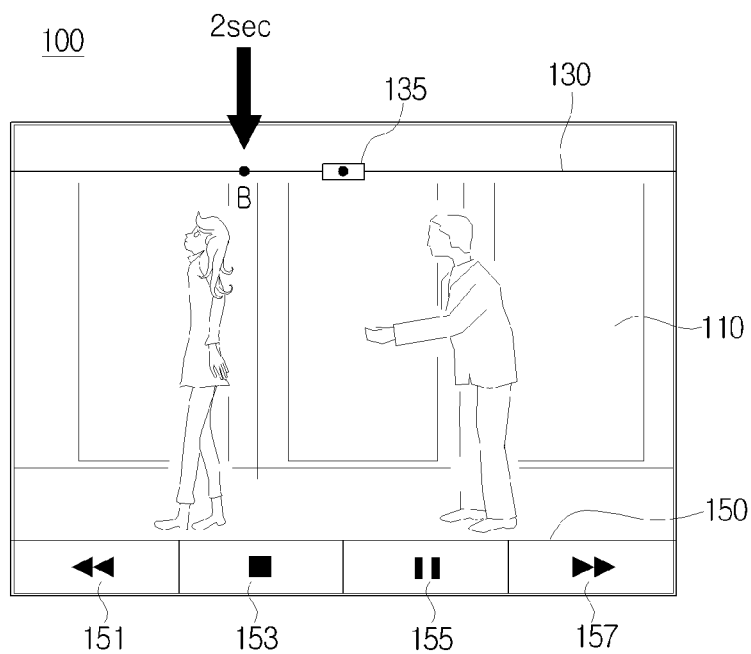
Figure 1C:
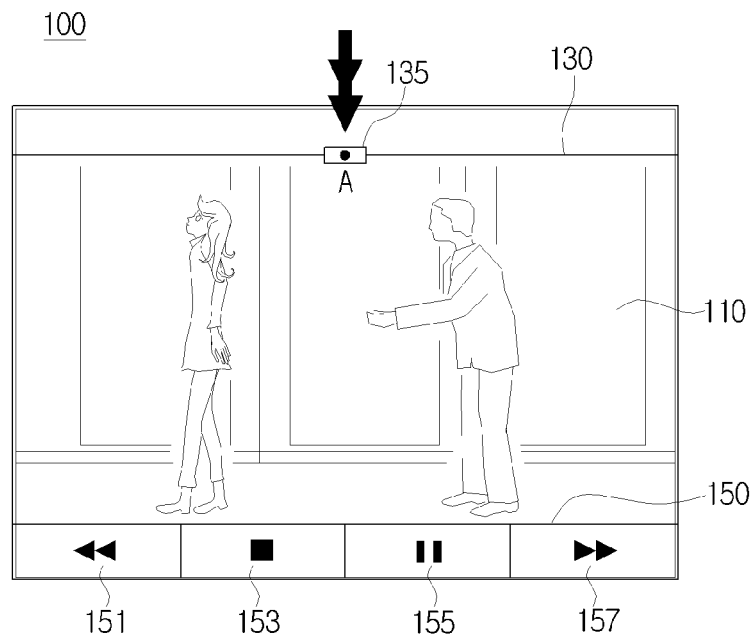
Figure 1D:
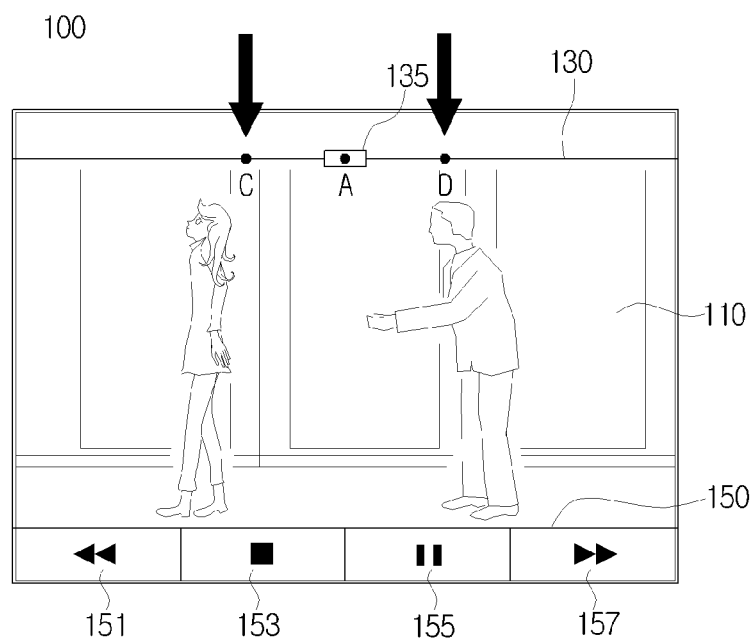
Figure 1E:
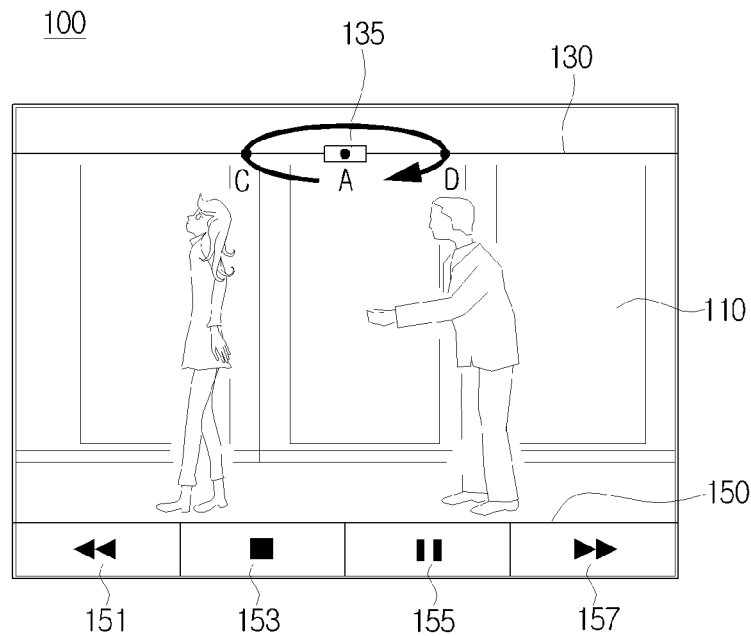
Figure 1F:
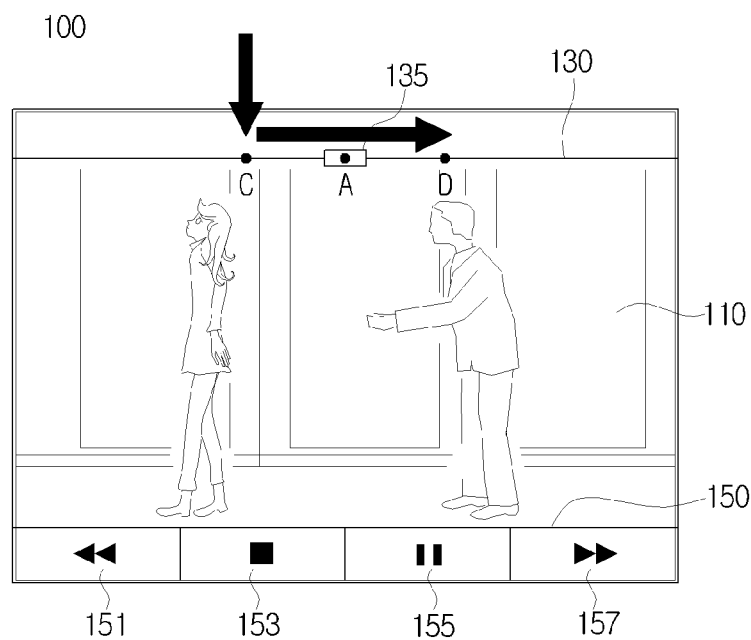
Figure 1G:
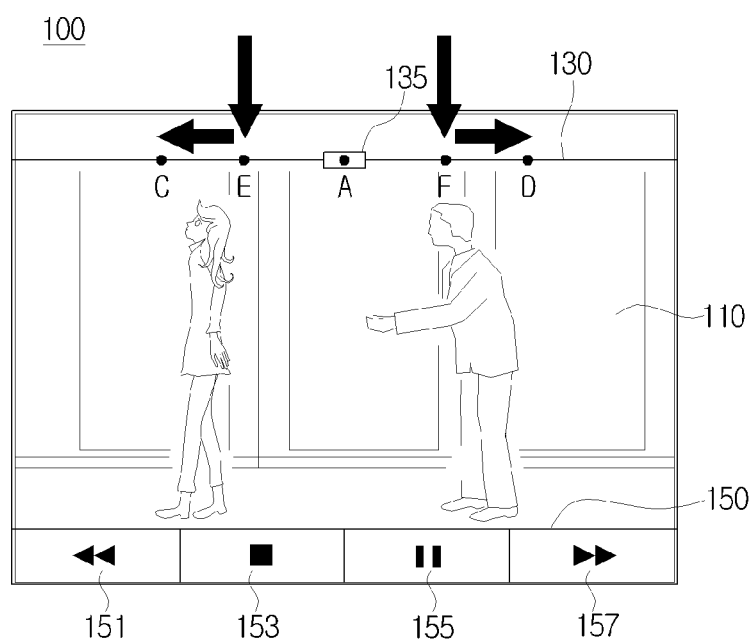
Figure 2A:
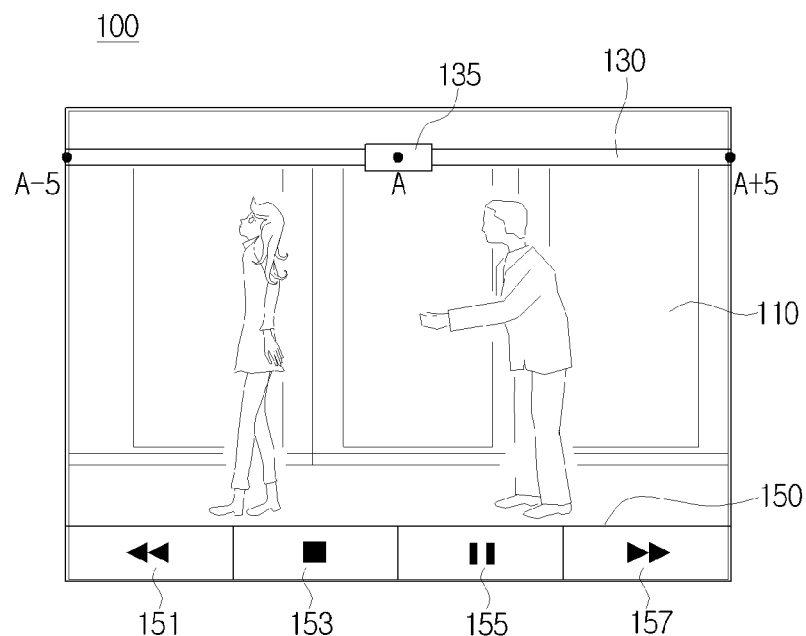
FIGS. 2A to 2D are views illustrating an enlarged progress bar.

FIGS. 1A to 1G are views illustrating a method for enlarging the progress bar 130, and FIGS. 2A to 2D are views illustrating the enlarged progress bar 130. FIG. 1A illustrates a method for enlarging the progress bar 130 by touching the position indicator 135 for two seconds or more. As illustrated in FIG. 1A, if the user touches the position indicator 135 of the progress bar 130 on the touch screen 100 for two seconds or more, the section of the progress bar 130 between the position corresponding to 5 minutes before position 'A' on which the position indicator 135 is located, and the position corresponding to 5 minutes after position 'A' is enlarged on the touch screen 100 as shown in FIG. 2A.

FIG. 2A illustrates the enlarged progress bar on the touch screen 100 after the user touches the position indicator 135 for two seconds or more as illustrated in FIG. 1A. Referring to FIG. 2A, the screen 110 and the set of items 150 are not enlarged or reduced, and only the progress bar 130 is enlarged, such that the bar 130 allows selection of times ±5 minutes of position A. However, it is understood that the enlarged bar could show more or less than ±5 minutes. Comparing the enlarged progress bar 130 in FIG. 2A with the normal progress bar 130 in FIG. 1A, the position indicator 135 has been enlarged and the single line representing the entire length of the video content has changed to double lines representing only a section of the entire length of the video content. Since a section of the progress bar 130 which the user wishes to adjust is enlarged and the remaining section disappears, the user can more precisely adjust the enlarged progress bar 130. While described as being represented by double lines, it is understood that the enlarged bar 130 need not be changed in appearance from the regular bar 130 shown in FIG. 1A, and may be otherwise changed to indicate that the bar 130 has been enlarged.

For example, if the total duration of the video content is one hour and the progress bar 130 is 5 cm in length, 1 cm of the progress bar 130 corresponds to 12 minutes of the video content. However, since the enlarged progress bar 130 of 5 cm contains 10 minutes of video content, 1 cm of the enlarged progress bar 130 contains the video content of 2 minutes. Accordingly, the user can operate the progress bar 130 six times more precisely to play back the video content when the bar 130 is enlarged as in FIG. 2A. Moreover, it is understood that the progress bar 130 in FIG. 2A could be enlarged multiple time through the same process in order to achieve a finer resolution for the progress bar 130. For instance, by again touching the progress bar of FIG. 2A for 2 seconds, the progress bar 130 could be again enlarged such that where each cm of the again enlarged progress bar 130 includes 1 minute of the video content.

Figure 2B:
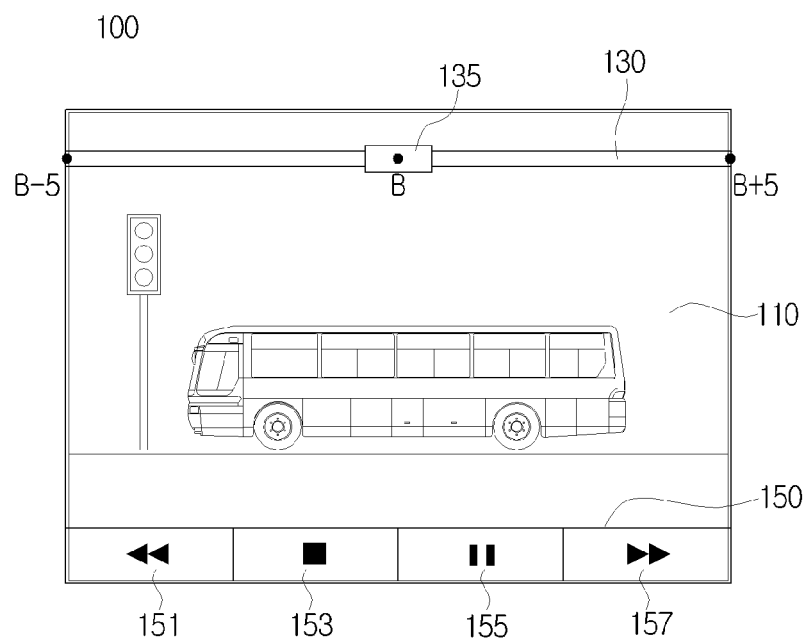

FIG. 1B illustrates a method for enlarging the progress bar 130 by touching a position on the progress bar 130 other than the position indicator 135 for two seconds or more. Referring to FIG. 1B, the user can enlarge the progress bar 130 by continuously touching position 'B' on the progress bar 130 where the position indicator 135 is not located for two seconds or more. In this situation, as illustrated in FIG. 2B, the section of the progress bar 130 between the position corresponding to 5 minutes before position 'B' selected by the user and the position corresponding to 5 minutes after position 'B' is enlarged on the touch screen 100. In addition, since the user has selected position 'B', a video different from the video of position 'A' is displayed.

FIG. 1C illustrates a method for enlarging the progress bar 130 by touching the position indicator 135 twice. Referring to FIG. 1C, the user can enlarge the progress bar 130 by touching position 'A', where the position indicator 135 is located, twice in quick succession. In this situation, as illustrated in FIG. 2A, the section of the progress bar 130 between a position corresponding to 5 minutes before position 'A' selected by the user and a position corresponding to 5 minutes after 5 minutes after position 'A' is enlarged on the touch screen 100. This has the same result as when the position indicator 135 is touched for two seconds or more, as shown in FIG. 1A.

FIG. 1D illustrates a method for enlarging the progress bar 130 by touching two positions on the progress bar 130. Referring to FIG. 1D, if the user selects and touches position 'C' and position 'D', the section of the progress bar 130 between position 'C' and position 'D' is enlarged as shown in FIG. 2C.

There are diverse manners in which position 'C' and position 'D' may be touched. That is, the user may touch position 'C' and then position 'D' within a certain period of time, for example, within one second, or may touch position 'C' and position 'D' at the same time.

Figure 2C:
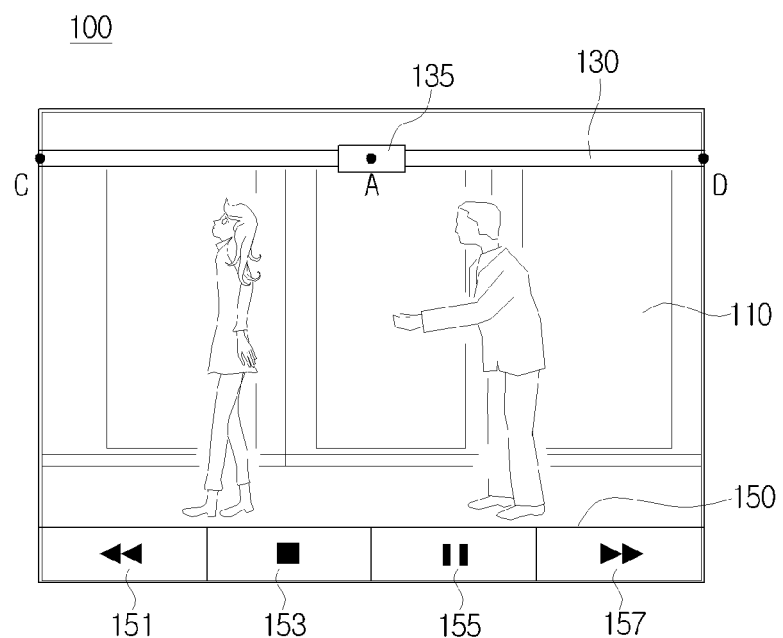

In this situation, as illustrated in FIG. 2C, a section between position 'C' and position 'D' is enlarged and displayed. Therefore, the user can more precisely operate the progress bar 130 using the enlarged progress bar 130 to play back the video content.

For example, if the total duration of the video content is one hour and the progress bar 130 is 5 cm in length, 1 cm of the progress bar 130 corresponds to 12 minutes of video content. If the duration of the video content between position 'C' and position 'D' which are touched by the user is 20 minutes, 1 cm of the enlarged progress bar 130 corresponds to 4 minutes of video content. Accordingly, the user can operate the progress bar 130 three times more precisely to play back the video content.

In this situation, unlike the example illustrated in FIG. 2A, position 'A' may be a position on the enlarged progress bar 130 defined by position 'C' and 'D' other than the center. In this exemplary embodiment of the present invention, positions on the right and left of the position indicator 135 are touched, so the position indicator 135 is included on the enlarged progress bar 130. However, this is merely an example for convenience of description. It is also possible to enlarge a section of the progress bar 130 excluding the position indicator 135.

FIG. 1E illustrates a method for enlarging the progress bar 130 by drawing a circle including two positions on the progress bar 130 between which the user wishes to enlarge. Referring to FIG. 1E, if the user touches the touch screen 100 by drawing a circle including position 'C' and position 'D' on the progress bar 130, the section of the progress bar 130 between position 'C' and position 'D' is enlarged.

There are diverse manners in which position 'C' and position 'D' may be touched. Accordingly, the present invention is applicable to a situation in which a user continuously touches certain portions of the progress bar 130 while passing through position 'C' and position 'D' on the progress bar 130. For example, the user may select two positions 'C' and 'D' on the progress bar 130 by drawing a letter 'V' including position 'C' and position 'D' on the touch screen 100 instead of drawing a circle.

In this situation, a section of the progress bar 130 between position 'C' and position 'D' is enlarged and displayed. Unlike the example illustrated in FIG. 2A, position 'A' may be a position on the enlarged progress bar 130 defined by position 'C' and 'D' other than the center.

FIG. 1F illustrates a method for enlarging the progress bar 130 by touching one of two positions on the progress bar 130 between which the user wishes to enlarge, and performing dragging from one position to the other. Referring to FIG. 1F, if the user touches position 'C' on the progress bar 130 and performs dragging from position 'C' to position 'D', the section of the progress bar 130 between position 'C' and position 'D' is enlarged, also resulting in the enlarging shown in FIG. 2C.

FIG. 1G illustrates a method for enlarging a section of the progress bar 130 between two positions and displaying another section of the progress bar 130 between another two positions without enlargement. Referring to FIG. 1G, the user touches with his or her fingertips or with another object two positions 'E' and 'F' on the progress bar 130, and drags the points in contact along the progress bar 130 to another two positions 'C' and 'D' and stop touching the progress bar 130. As a result, the progress bar 130 is displayed between positions 'C' and 'D' where the user finishes touching, and enlarged between positions 'E' and 'F' where the user starts touching the progress bar 130.

Specifically, the user may start touching the progress bar 130 with his or her fingertips or with another object at positions 'E' and 'F' and drag the points in contact to positions 'C' and 'D', to select a section to be enlarged (that is, the section between positions 'E' and 'F') and a section to be displayed without enlargement (that is, the section between positions 'C' and 'D').

Figure 2D:
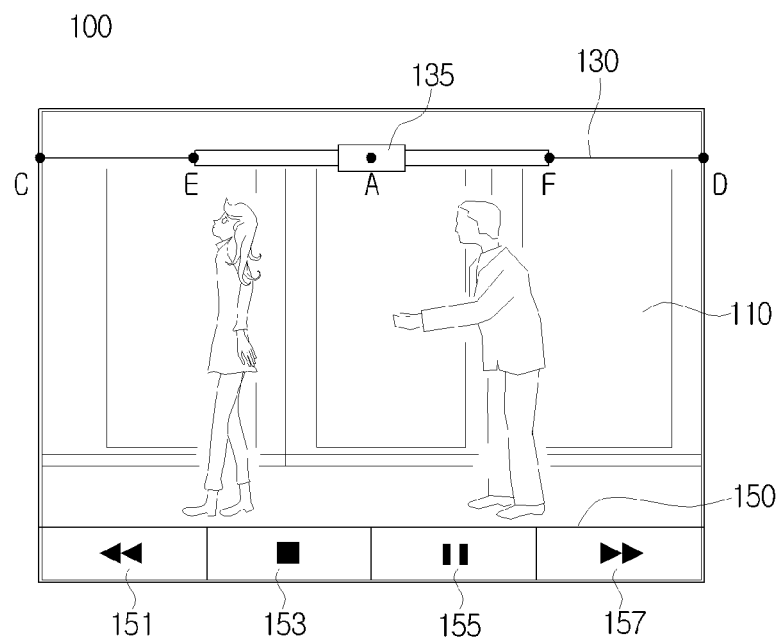

FIG. 2D illustrates the progress bar 130 displayed and partially enlarged as a result of being touched in the manner illustrated in FIG. 1G. Referring to FIG. 2D, the section between positions 'C' and 'E' and the section between positions 'F' and 'D' are indicated by a single line, while the section between positions 'E' and 'F' is indicated by double lines. The position indicator 'A' is placed between positions 'E' and 'F'. As explained above, the section between positions 'E' and 'F' where the user starts touching the progress bar 130 is enlarged and displayed, and the section between positions 'C' and 'D' where the user finishes touching the progress bar 130 is displayed without enlargement.

However, the above example is explained only for the purpose of illustration, and the concept of the present invention can be appropriately applied to various other examples. For example, the section between the positions where the user starts touching the progress bar 130 may be displayed on the touch screen 100 without enlargement, and the section between the positions where the user finishes touching the progress bar 130 may be enlarged and displayed.

Furthermore, the position indicator 'A' may be placed in a position other than the middle of the progress bar 130, since the progress bar 130 is not enlarged with reference to the position indicator 'A'. Moreover, while shown in FIGS. 1C through 1G as enlarging the progress bar 130 in areas around the position indicator 'A', it is understood that the position could be other than around the position indicator 'A' such that the position indicator 'A' need not be included in the enlarged progress bar 130 as in FIG. 2B.

In the example explained above, the progress bar 130 is enlarged when an enlargement command is input by a user. However, this is merely exemplary, and other processes may be applied. For example, visual or audio information may be provided to the user to notify that the command to enlarge a certain section of the progress bar 130 has been successfully input and that the section of the progress bar 130 is being enlarged as instructed. For example, a message 'ENLARGEMENT IN PROGRESS' or corresponding audio information may be output in response to the enlargement command, thereby enabling the user to prepare for the next operation with respect to the enlargement of the progress bar 130.

Alternatively, a certain section of the progress bar 130, which a user intends to enlarge, may be highlighted before being enlarged, in response to the enlargement command. In this manner, the user is able to check if the section has been input correctly before the progress bar 130 is enlarged, and if not, is able to re-input the section he or she intends to enlarge.

Figure 3:
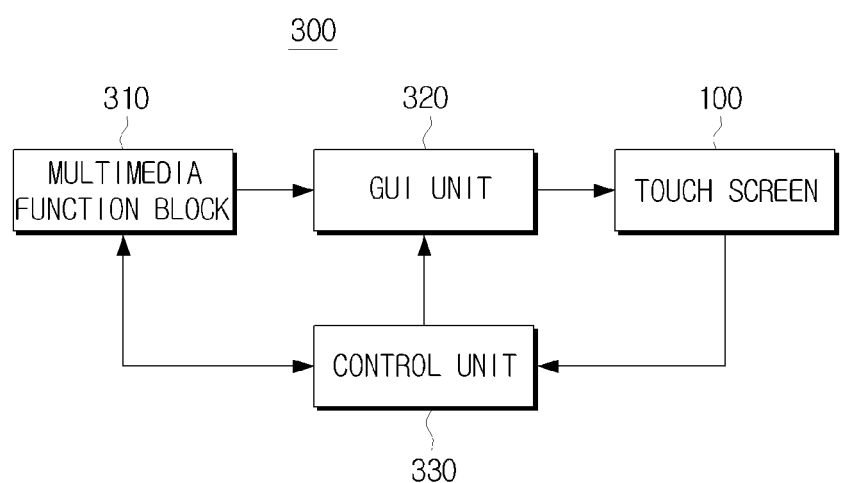
FIG. 3 is a block diagram illustrating a multimedia apparatus capable of providing a graphical user interface (GUI) including an enlarged progress bar.

FIG. 3 is a block diagram of a multimedia apparatus 300 capable of providing a GUI including an enlargeable progress bar 130 according to an exemplary embodiment of the present invention. Referring to FIG. 3, the multimedia apparatus 300 includes a multimedia function block 310, a graphical user interface (GUI) unit 320, a touch screen 100, and a control unit 330. However, it is understood that additional units could be included in addition to or instead of the shown multimedia function block 310, a graphical user interface (GUI) unit 320, a touch screen 100, and a control unit 330. For instance, the multimedia apparatus 300 could include a camera, a wireless network interface, a phone, removable media, a remote control, etc. Moreover, the touch screen 100 can be included separately from the apparatus 300 and be connected through a wired and/or wireless connection.

The multimedia function block 310 carries out general functions of a multimedia apparatus, including playback, skipping, stopping, or shifting a section of a file. The GUI unit 320 adds a GUI to a video being generated by the multimedia function block 310. The touch screen 100 is employed to receive user operations by touching or dragging, and to display a GUI-incorporated video using the items output from the GUI unit 320. The control unit 330 controls the operation of the multimedia function block 310 according to the user input received through the touch screen 100 or other possible input mechanisms (not illustrated). Examples of such mechanisms include clickwheels, keyboards, remote controls, etc.

The control unit 330 controls the GUI unit 320 so that the GUI is displayed on the touch screen 100 according to the user input. Specifically, if the user inputs a command through the touch screen 100 to display the progress bar 130 regarding the content being currently played, the control unit 330 controls the GUI unit 320 so that the progress bar 130 is displayed on the currently played content. If the user inputs commands (such as play 155, stop 153, or skip 151, 157) through the item set 150 of the touch screen 100, the control unit 330 plays, stops or skips the content according to the input command. If the user inputs a command to change the position indicator 135 through the progress bar 130 of the touch screen 100, the control unit 330 controls the GUI unit 320 to move the position indicator 135 to the position touched by the user, and controls the multimedia function block 310 to display the content from the position that corresponds to the shifted position.

If the user inputs a command to enlarge the progress bar 130 of the touch screen 100, the control unit 330 controls the GUI unit 320 to enlarge a section between the positions selected by the user previously or currently, and to display the result.

If the user inputs a command to enlarge a certain portion of the progress bar 130 of the touch screen 100, the control unit 330 controls the GUI unit 320 to highlight the intended section of the progress bar 130 before enlarging and displaying the selected section.

If the user inputs a command to enlarge the progress bar 130 of the touch screen 100, the control unit 330 controls the multimedia function block 310 and the GUI unit 320 so that visual or audio information is output to indicate that the command is received, and the progress bar 130 is enlarged and displayed.

Figure 4:
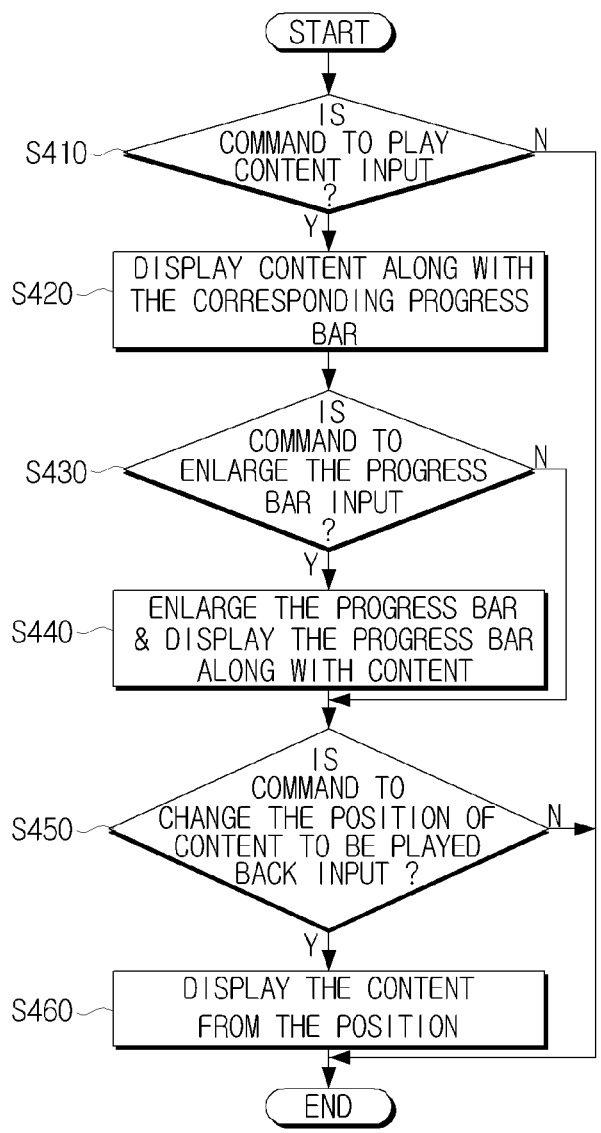
FIG. 4 is a flowchart illustrating a method for providing a GUI according to an exemplary embodiment of the present invention.

FIG. 4 is a flowchart illustrating a method for providing a GUI according to an exemplary embodiment of the present invention. In operation S410, the control unit 330 determines whether a command to play content is input or not. In operation S410-N, if no input is received, the method ends. In operation S410-Y, if a play command is input, the control unit 330 causes the corresponding content to be displayed on the touch screen 100 along with the corresponding progress bar 130 in operation S420.

In operation S430, the control unit 330 determines whether a command to enlarge the progress bar 130 is input or not. If no command is received, the method moves to operation S450 in S430-N. In operation S430-Y, if the enlargement command is received, the control unit 330 controls the GUI unit 320 to enlarge and display the progress bar 130. In operation S440, the enlarged progress bar 130 is displayed along with the content. As a result, the user can operate the progress bar 130 more conveniently and precisely, since the progress bar 130 is increased in size.

In operation S450, the control unit 330 determines whether the position indicator 135 is moved on the progress bar 130, thereby indicating the user's intention to change the position of the content to be played back. In operation S450-Y, if the user's intention to change the position of the content to be played back is input, in operation S460, the control unit 330 controls the multimedia function block 310 to display the content from the position input by the user. If no command is received, the method ends in operation S450-N.

Since the progress bar 130 can be increased in size, the user can operate the progress bar 130 conveniently and with greater precision.

While the exemplary embodiments explained above employed the enlargeable progress bar 130 to explain the method of displaying a GUI item according to the present invention, these are only employed for the sake of explanation, and those skilled in the art will understand that examples other than the progress bar 130 are applicable as a GUI item. For instance, aspects can be applied to a GUI item in which different displayed locations correspond to different properties of content being recorded or reproduced. For example, the GUI item can be a status control bar such as a volume bar or a channel bar, or scroll bar may be adequately employed, thereby allowing more precise control over volume, channel selection, and scrolling within documents. Further, while described in terms control of contents using bars for two dimensional control of the contents, the progress bar 130 could be a three dimensional representation of properties of the contents, such as where the GUI item is rectangular or circular to allow changes in content properties in multiple dimensions, directions, and/or combinations of directions and speed. Lastly, while described in terms of enlarging the progress bar 130, it is understood that the command could be to adjust a size of the progress bar 130, such as through reducing as opposed to enlarging the progress bar 130.

As explained above, according to the exemplary embodiments of the present invention, the GUI item is enlarged and displayed for convenience of the user, thereby enabling the user to operate the progress bar more correctly and conveniently. Additionally, superb visual effect is provided by the enlargeable GUI item. Further, while not required, it is understood that aspects of the invention can be implemented using software and/or firmware stored on computer readable media for use by one or more processors or computers. Examples of such processors can include the multimedia function block 310, a graphical user interface (GUI) unit 320, a touch screen 100, and/or the control unit 330 shown in FIG. 3.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing, on a touch screen, a graphical user interface (GUI) including a first progress bar having a position indicator to indicate a playback position of a content, the method comprising:
   detecting an initial touch applied at the position indicator;
   in response to the initial touch being applied for a duration greater than a threshold amount of time and detecting a dragging gesture being applied to the position indicator after the initial touch, performing a shifting of a playback position of the content in a first mode; and
   in response to the initial touch being applied for a duration less than the threshold amount of time and detecting the dragging gesture being applied to the position indicator after the initial touch, performing a shifting of a playback position of the content in a second mode; and
   in response to the initial touch being applied for a duration greater than the threshold amount of time, displaying a second progress bar representing a second playback duration which is shorter than the first playback duration and having a resolution that is finer than a resolution of the first progress bar associated with a first playback duration,
   wherein the playback position can be adjusted more precisely in the first mode than in the second mode, and
   wherein when the second progess bar is displayed, a position of the position indicator does not change.

2. The method of claim 1, wherein the second progress bar comprises an enlarged portion of the first progress bar corresponding to a predetermined interval range centered about the position indicator and that is displayed instead of the first progress bar.

3. The method of claim 1, wherein the displaying the second progress bar comprises controlling a portion of the first progress bar to be enlarged in between the initial touch and the release from the dragging gesture.

4. The method of claim 1, wherein the displaying the second progress bar comprises highlighting a position on the first progress bar to which the finer resolution is applied.

5. The method of claim 1, wherein the second progress bar is displayed on a position that the first progress bar associated with the first playback duration has been displayed on, such that the first progress bar associated with the first playback duration is not displayed on the position.

6. The method of claim 1, wherein a location of the position indicator is not affected when displaying the second progress bar.

7. A method of providing, on a touch screen, a graphical user interface (GUI) including a first progress bar having a position indicator to indicate a playback position of a content, the method comprising:
  detecting an initial touch applied at the position indicator;
  in response to the initial touch being applied for a duration greater than a threshold amount of time and detecting a dragging gesture being applied to the position indicator after the initial touch, performing a shifting of a playback position of the content in a first mode; and
  in response to the initial touch being applied for a duration less than the threshold amount of time and detecting the dragging gesture being applied to the position indicator after the initial touch, performing a shifting of a playback position of the content in a second mode: and
  in response to the initial touch being applied for a for a duration greater than the threshold amount of time, displaying a second progress bar representing a second playback duration which is shorter than the first playback duration and having a resolution that is finer than a resolution of the first progress bar associated with a first playback duration,
  wherein the playback position can be adjusted via the position indicator more precisely in the first mode than in the second mode, and
  wherein when the second progress bar is displayed, a position of the position indicator does not change.

8. The method of claim 7, wherein the second progress bar comprises an enlarged portion of the first progress bar corresponding to a predetermined interval range centered about the position indicator and that is displayed instead of the first progress bar.

9. The method of claim 7, wherein the displaying the second progress bar comprises controlling a portion of the first progress bar to be enlarged in between the initial touch and the release from the dragging gesture.

10. The method of claim 7, wherein the displaying the second progress bar comprises highlighting a position on the first progress bar to which the finer resolution is to be applied.

11. The method of claim 7, wherein the second progress bar is based on location of the position indicator when the initial touch is applied for the duration greater than the threshold amount of time.

12. The method of claim 7, wherein the second progress bar is displayed on a position that the first progress bar associated with the first playback duration has been displayed on, such that the first progress bar associated with the first playback duration is not displayed on the position.

13. The method of claim 7, wherein a location of the position indicator is not affected when displaying the second progress bar.

14. A multimedia apparatus, comprising:
  a touch screen configured to display a graphical user interface (GUI) including a first progress bar having a position indicator to indicate a playback position of a content; and
  a controller configured to determine whether an initial touch is applied at the position indicator, and in response to the initial touch being applied for a duration greater than the threshold amount of time and detecting a dragging gesture being applied to the position indicator after the initial touch, controls to shift a playback position of the content in a first mode, and in response to the initial touch being applied for a duration less than the threshold amount of time and detecting the dragging gesture being applied to the position indicator after the initial touch, controls to shift a playback position of the content in a second mode,
  wherein, in response to the initial touch being applied for a duration greater than the threshold amount of time the controller controls the touch screen to display a second progress bar representing a second playback duration which is shorter than the first playback duration and having a resolution that is finer than a resolution of the first progress bar associated with a first playback duration, and
  wherein the playback position can be adjusted more precisely in the first mode than in the second mode, and
  wherein when the second progress bar is displayed, a position of the position indicator does not change.

15. The apparatus of claim 14, wherein the second progress bar comprises an enlarged portion of the first progress bar corresponding to a predetermined interval range centered about the position indicator and that is displayed instead of the first progress bar.

16. The apparatus of claim 4, wherein the controller controls the touch screen to display the second progress bar by controlling a portion of the first progress bar to be enlarged in between the initial touch and the release from the dragging gesture.

17. The apparatus of claim 14, wherein the controller controls the touch screen to display the second progress bar when a highlighted position on the first progress bar is received by the touch screen to which the finer resolution is to be applied by the controller.

18. The apparatus of claim 14, wherein the controller controls the touch screen to display the second progress bar based on location of the position indicator when the initial touch is applied for the duration greater than the threshold amount of time.

19. The apparatus of claim 14, wherein the controller controls the touch screen to display the second progress bar on a position that the first progress bar associated with the first playback duration has been displayed on, such that the first progress bar associated with the first playback duration is not displayed on the position.

20. The apparatus of claim 14, wherein a location of the position indicator is not affected when displaying the second progress bar.

21. A multimedia apparatus, comprising:
  a touch screen configured to display a graphical user interface (GUI) including a first progress bar having a position indicator to indicate a playback position of a content; and a controller configured to determine whether an initial touch is applied at the position indicator, and in response to the initial touch being applied for a duration greater than the threshold amount of time and detecting a dragging gesture being applied to the position indicator after the initial touch, controls to shift a playback position of the content in a first mode, and in response to the initial touch being applied for a duration less than the threshold amount of time and detecting the dragging gesture being applied to the position indicator after the initial touch, controls to shift a playback position of the content in a second mode, wherein, in response to the initial touch being applied for a duration greater than the threshold amount of time, the controller controls the touch screen to display a second progress bar representing a second playback duration which is shorter than the first playback duration and having a resolution that is finer than a resolution of the first progress bar associated with a first playback duration, and wherein the playback position can be adjusted via the position indicator more precisely in the first mode than in the second mode, and wherein when the second progress bar is displayed, a position of the position indicator does not change.

22. The apparatus of claim 21, wherein the second progress bar comprises an enlarged portion of the first progress bar corresponding to a predetermined interval range centered about the position indicator and that is displayed instead of the first progress bar.

23. The apparatus of claim 21, wherein the controller controls the touch screen to display the second progress bar by controlling a portion of the first progress bar to be enlarged in between the initial touch and the release from the dragging gesture.

24. The apparatus of claim 21, wherein the controller controls the touch screen to display the second progress bar when a highlighted position on the first progress bar is received by the touch screen to which the finer resolution is to be applied by the controller.

25. The apparatus of claim 21, wherein the controller controls the touch screen to display the second progress bar based on a location of the position indicator when the initial touch is applied for the duration greater than the threshold amount of time.

26. The apparatus of claim 21, wherein the controller controls the touch screen to display the second progress bar on a position that the first progress bar associated with the first playback duration has been displayed on, such that the first progress bar associated with the first playback duration is not displayed on the position.

27. The apparatus of claim 21, wherein a location of the position indicator is not affected when displaying the second progress bar.

28. The method of claim 1, wherein the second progress bar is based on location of the position indicator when the initial touch is applied for the duration greater than the threshold amount of time.

29. The method of claim 1, wherein the second progress bar is displayed instead of the first progress bar after the initial touch is applied for a duration greater than the threshold amount of time, and in response to performing a gesture to end the displaying of the second progress bar, re-displaying the first progress bar instead of the second progress bar.

30. The method of claim 29, wherein the gesture to end the displaying of the second progress bar and re-display the first progress bar instead of the second progress bar is performed with respect to the position indicator.

31. The method of claim 30, wherein the initial touch, the dragging gesture applied to the position indicator after the initial touch, and the gesture to end the displaying of the second progress bar and re-display the first progress bar are all applied to the same position indicator.

32. The method of claim 1, wherein the initial touch and the dragging gesture applied to the position indicator after the initial touch are both applied to the same position indicator.

33. The method of claim 1, wherein, in response to the position indicator moving for a first distance in the displayed first progress bar, the playback duration is changed based on the first playback duration, and in response to the position indicator moving for the first distance in the displayed second progress bar, the playback duration is changed based on the second playback duration, which is shorter than the first playback duration.

* * * * *